United States Patent
Quine

(10) Patent No.: US 6,717,957 B1
(45) Date of Patent: Apr. 6, 2004

(54) METHOD FOR DELIVERING INFORMATION IN A CLOSED LOOP MULTIMEDIA SYSTEM

(75) Inventor: Douglas B Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 698 days.

(21) Appl. No.: 09/696,133

(22) Filed: Oct. 26, 2000

(51) Int. Cl.[7] .................................................. H04J 1/00
(52) U.S. Cl. .......................... 370/487; 370/493; 709/219
(58) Field of Search ............................... 370/480, 485, 370/486, 487, 493, 494, 495; 709/217, 218, 219, 201, 203

(56) References Cited

U.S. PATENT DOCUMENTS

| | | | | |
|---|---|---|---|---|
| 5,239,466 A | * | 8/1993 | Morgan et al. | 715/512 |
| 5,721,815 A | * | 2/1998 | Ottesen et al. | 345/721 |
| 5,751,883 A | * | 5/1998 | Ottesen et al. | 386/27 |
| 5,995,594 A | | 11/1999 | Shaffer et al. | 379/88 |
| 6,203,192 B1 | * | 3/2001 | Fortman | 379/88.14 |
| 6,513,003 B1 | * | 1/2003 | Angell et al. | 704/235 |

* cited by examiner

Primary Examiner—Douglas Olms
Assistant Examiner—Bob A. Phunkulh
(74) Attorney, Agent, or Firm—Christopher J. Capelli; Angelo N. Chaclas

(57) ABSTRACT

A closed-loop message distribution method is disclosed for accepting documents from a variety or sources via a plurality of media, presenting the documents to a plurality of recipients through their preferred communications channel, document personalization, and suppressing delivery of follow-up documents to those recipients who have responded to an earlier related message.

9 Claims, 4 Drawing Sheets

METHOD FOR DELIVERING INFORMATION IN A CLOSED LOOP MULTIMEDIA SYSTEM

FIELD OF THE INVENTION

The present invention relates to a method for eliminating duplicate or unnecessary messages in a message delivery system. More particularly, it relates to a method for accepting documents from a variety of sources via a plurality of media, forwarding the received documents to a plurality of recipients through their preferred communications mode/channel, personalizing/condensing documents, and suppressing the delivery of follow-up documents to those recipients who have responded to an earlier notification/message.

BACKGROUND OF THE INVENTION

Businesses today rely on their messaging systems more than ever before. Most corporations generally correspond with their employees in a variety of communication formats and media which include, for example, telephonic communications, facsimile, e-mail, and delivery of hardcopies, to name a few. There is no doubt that these corporate-to-employee communications, sometimes also referred to as business-to-employee (B2E) communications, generate an extraordinary amount of paper documents to employees Appendix "A" is an incomplete listing of general distribution communications that an employee of a company would typically receive.

These communications vary in importance from mass distribution informational notices to confidential personalized communications of importance to the individual employee. Typically, business-to-employee communications may include shareholder communications, communications related to healthcare and insurance, training materials, organizational announcements, and also information related to various departments/divisions, to name a few as non-limiting examples.

Often times, a notification or a message is followed by numerous updates and reminders. These updates and reminders are sent regardless of whether the recipient responds immediately or never responds. Most of these communications are sent in a default format and by means of a default communication medium which is adopted as a policy within a corporation, and thus a recipient has no say in requesting notification in a medium of recipient's choice.

At times, documents are even sent by both e-mail and in hard copy in an effort to reach the population of employees using e-mail as well as those receiving only hard copy; inevitably there is overlap in these mailing lists leading to duplication of messages, loss of corporate credibility, and wasted employee time. Furthermore, currently there is no provision to eliminate delivery of duplicate information or information that is clearly not valued by the recipient. For example, such inappropriate information could include employee clinic announcements of PAP tests (in the case of male employees), announcements of prostate cancer tests (in the case of women) or even employee athletic announcements (in the case of non-athletes). Thus, there is a need to reduce document distribution costs while improving delivery speed, accuracy, and effectiveness.

Closed loop messaging systems in the area of marketing have existed for quite some time wherein business entities have been known to send repeated subscription renewal notices to customers until the customer renews the subscription. The delivery of renewal notices to customers is stopped once a customer renews the subscription. An example, for instance, could be a communications campaign to encourage employees to join a travel service. Multiple messages to employees after they have heeded this "call to action" and joined the service only serve to annoy the employees, waste time and effort, reduce corporate credibility, and "cry wolf". There is a risk that employees will disregard future important communications from the same source.

Multimedia or hybrid messaging systems are also known in the prior art. For example, Pitney Bowes Streamwaver™ and Pitney Bowes Digital Document Delivery (D3)™ system allow a single document print stream to be split and distributed through various media.

It is also known to provide notifications to users of messages located in their message mailboxes. U.S. Pat. No. 5,995,594 to Shaffer et al. discloses a system and method for notifying a user of an awaiting message. In Shaffer, the user is first provided with a notification which is different for different types of messages, and it is repeated if the user fails to respond to the notification. The repeating occurs until the user responds to the notification, and then it is repeated after a predetermined period of time, and a user is then informed of the awaiting message located in user's mailbox. Although Shaffer's invention can be used in any other type of multimedia messaging system (e.g., facsimile, e-mail, video), it merely supplements or eliminates the need for message waiting lights and stutter dial tones.

The prior art fails to teach or suggest a closed-loop multimedia (hybrid) messaging system capable of accepting messages/documents from a variety of sources, and in a plurality of formats via a plurality of communication media; and forwarding the received document(s)/message(s) to a plurality of recipients through their preferred mode of communication in their preferred format. Therefore, there is a need not only to eliminate delivery of redundant or duplicate information, or information that a recipient is not interested in, but also to facilitate delivery of information to a recipient in a format that conforms to the choice of the recipient. The closed-loop multimedia (hybrid) messaging system of the present invention offers an effective solution overcoming the problems encountered by the prior art.

SUMMARY OF THE INVENTION

According to the invention, a closed-loop multimedia (hybrid) messaging system and method are provided for accepting documents from a variety of sources in a plurality of formats via a plurality of media, forwarding the received documents/messages to a plurality of recipients through their preferred mode of communication, personalizing/condensing documents, and suppressing the delivery of follow-up documents to those recipients who have responded to an earlier notification/message.

A preferred embodiment of the system includes a communications system that is capable of receiving input from a plurality of sources in a variety of formats via a variety of communication media. The communications system is further capable of forwarding the received information to a plurality of recipients in a plurality of formats via a plurality of media. Each sender selects recipients individually or by defining the desired parameters (e.g. location, job description) for each of the recipients. The recipients may also be selected from a pre-existing distribution list. A database system that is in communication with the communications system is provided for storing information pertaining to recipients including their address and preferences.

Each of the plurality of recipients may update their preferences in the database system regarding the medium of communication, location of preferred delivery (e.g. home or work e-mail address), and document delivery formats. The database is typically prepopulated with default settings (e.g. e-mail addresses for employees currently receiving e-mail, paper delivery for employees without a known e-mail address).

The closed-loop message delivery system further includes a reporting and control system for controlling the production and regeneration of documents using the data received by the communications system. The received data can be processed in an accounting system in order to generate accounting information for charging back to respective entities requesting message delivery services if desired for that business unit. Feedback responses from various recipients are tracked by a tracking system and follow-up documents or messages seeking response on the same topic are suppressed to those recipients who have responded to an earlier related notification or message.

Still other objects and advantages of the present invention will become apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which.

DETAILED DESCRIPTION OF THE PREFERRED EMBODIMENT

The present invention provides a closed-loop multimedia (hybrid) message delivery system and related method for accepting documents from a variety of sources in a plurality of formats via a plurality of media, personalizing/condensing documents, forwarding or delivering messages/documents to each of a plurality of recipients while suppressing duplicate or irrelevant documents/messages, the delivery of documents being made via a preferred communications medium, and in a preferred document/message format, according to the choice of the recipient.

Figure 1:
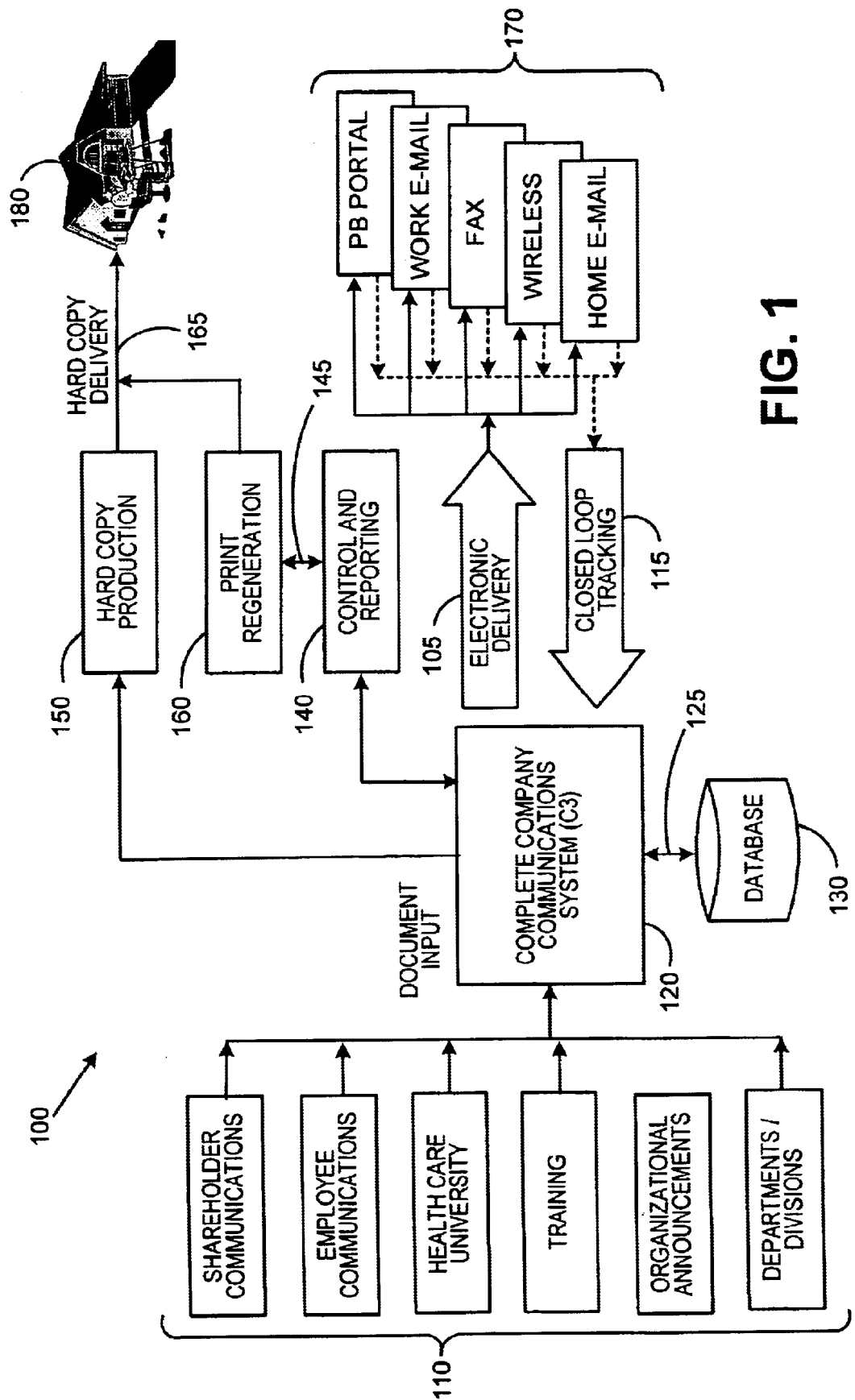
FIG. 1 illustrates an overview of the multimedia (hybrid) message delivery system of the present invention.

In describing the preferred embodiment of the present invention, reference is made to the drawings, wherein there is seen in FIG. 1 an example of the closed-loop multimedia (hybrid) message delivery system, generally designated 100. As will be described in greater detail below, message delivery system 100 includes a Complete Company Communications system (C3) 120 for receiving input data from a plurality of sources 110 within an organization. Typical organizational data from the plurality of sources may include information related to shareholder communications, employee communications, communications related to healthcare, employee training information, organizational announcements, and information regarding departments and the various divisions of an organization. These sources are provided for a better understanding of the invention, and therefore as such are not to be construed as limiting examples of the invention.

It is to be further understood that both senders and recipients as discussed in the instant invention are employees of an organization wherein the closed-loop message delivery system of the as described in the preferred embodiment is being used. Therefore for the purposes of this discussion of the preferred embodiment, a sender is an employee within the organization and may therefore be construed to be a user of the closed-loop message delivery system of the preferred embodiment. Similarly, a recipient is an employee or a user to whom a sender intends to deliver the information using the preferred embodiment. However, this concept is not limited to corporate communications. The concept as described in the preferred embodiment of the present invention could be equally applicable to any entity communicating to any set of recipients.

Figure 2:
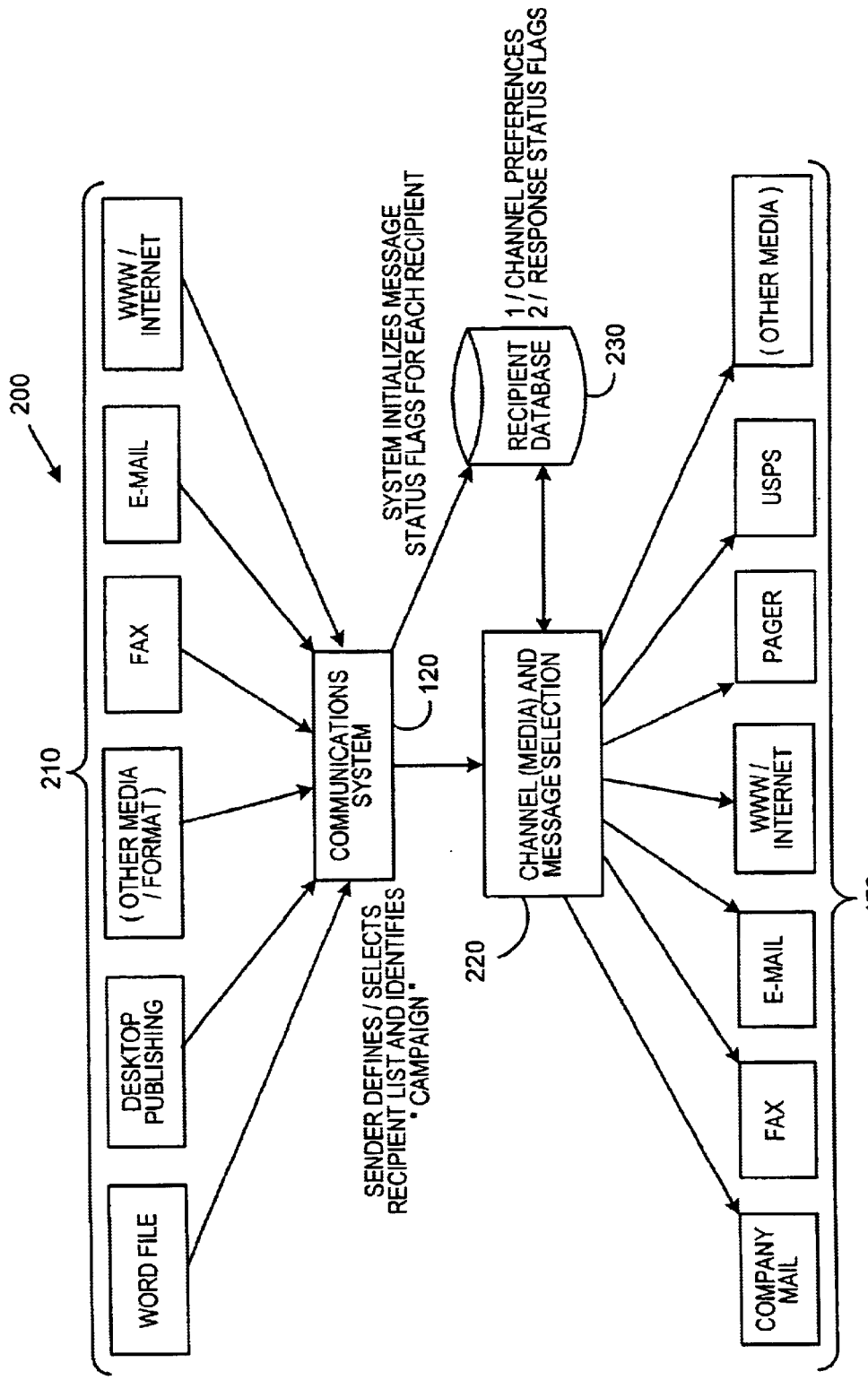
FIG. 2 is a block diagram depicting a flow chart that provides an overview of the steps performed to complete document submission by a sender in the illustrative embodiment.

Although not shown in FIG. 1, the Complete Company Communications (C3) system 120 is capable of receiving input data from senders present at each of the plurality of sources 110 in a variety of formats by means of a variety of media 210 which is discussed in greater detail in FIG. 2 of the present invention. The Complete Company Communications (C3) system 120, hereinafter referred to as "communications systems 120", is communicatively coupled to a database system 130 by means of link 125 which could be a wireline or a wireless link. The database system 130 could be a relational database management system (RDBMS) for storing contact information of each of the employees of the company in which the message delivery is contemplated. The contact information may include all the relevant information about an employee, such relevant information, for example, may include name, title, department & location information, e-mail address, etc.

The database system 130 further includes information related to employee preferences, such preferences may include format in which a recipient employee prefers to receive documents/messages, and also modes of communication preferred by the recipient employee. Each of the plurality of recipients may enroll or update their preferences in the database system regarding the medium of communication, location of preferred delivery (e.g. home or work e-mail address), and document delivery formats. The database is typically prepopulated with default settings (e.g. e-mail addresses for employees currently receiving e-mail, paper delivery for employees without a known e-mail address). Details of employee enrollment are discussed with respect to FIG. 4. The preferences of an employee as indicated at the time of enrollment are stored in the database system 130, and thus information related to an employee is provided to the communications system 120 by the database system 130 in order to forward documents or messages to various recipient employees not only in their preferred mode of communication but also in their preferred format as stored in the database system 130.

Recipient employees may be selected not only by defining the relevant parameters of a specific employee, but also from a geographical or departmental distribution list to which an employee belongs. Thus, messages or documents may be caused to be delivered to all employees belonging to a particular division of the company or employees residing in a particular geographical location of the company.

Various formats in which documents or messages may be sent may be for example: a word processing file such as an MS Word file, WordPerfect file, Excel File, a Desktop publishing application file, and as such to name a few. These formats are to be construed only as non-limiting examples and as such a message or document in any format is capable for delivery to a recipient through the message delivery system of the present invention. Also, various media for delivery of documents/messages may include regular mail, e-mail, facsimile, using the world wide web(www), internet, pager, or any other wireline or wireless communication network(s) or media.

Each of the messages or documents is delivered in a medium that best fits the category or type to which such a document belongs. For example, a paycheck stub may be sent via secure e-mail as it represents personal information of an employee. Similarly, employee meeting announcements may be made via standard e-mail. Furthermore, as such announcements tend to be very localized, the communications system 120 could insert only the local meeting place for the individual employee into each message rather than the more typical approach of sending a complete list of meeting places and expecting the employee to read a long memo to find the message related to themselves.

Such personalization/condensation of a document is a power tool in reducing message (document) length, saving reading time, and improving corporate credibility with the employee. Finally, lengthy policy statements or procedure manuals are unwieldy to send to each employee and are best retained in a central location where they can be updated as necessary. The most appropriate communications approach may be to send an e-mail containing a "hot link" to the current version of the document. These examples are provided to more clearly explain the invention and therefore should not be construed as limiting examples of implementing the inventive concept.

For the instant invention, the message delivery system 100 could also be considered as comprising a control & reporting system 140 which interacts with communications system 120 in order to control and account for the hard copy reproduction of documents at 150 and print regeneration of documents/messages at 160. If a recipient prefers to receive documents or messages via hardcopy delivery, then the communications system 120 causes the hardcopy production system 150 to print hardcopies of messages or documents to be forwarded to the intended recipient 180 by delivery means 165. The print regeneration tasks are triggered by message delivery failures caused by other modes of communication, for example print regeneration may be triggered by failure of e-mail or facsimile communication systems.

Thus, for instance, when other preferred modes of communication fail, hardcopies of documents/messages requested by a recipient are regenerated at print regeneration system 160 and delivered to the intended recipient by delivery means 165. Also, delivery means 165 may also be used to forward the hardcopies of documents generated at 150 to the intended recipient at 180. The control and reporting system 140 controls the regeneration of documents at 160 by signaling link 145. This signaling link could be a wireline link, for example, a cable running from the control and reporting system 140 to the print regeneration system 160. The signaling link could also be a wireless link wherein, for example, a transmitting antenna at the control and reporting system 140 transmits a signal to a receiving antenna of the print regeneration system 160. The hardcopy reproduction may also be dictated in accordance with preferences of the recipient employees as registered in the database system 130.

The recipient employee preferences are retrieved by the communications system 120 from the database system 130. The preference information may be conveyed to the control & reporting system 140 for controlling the generation of hard copies in accordance with user preferences registered in the database system 130 or to regenerate hardcopies of documents or messages at print regeneration system 160 for forwarding the same to an intended recipient at 180 by hardcopy delivery means 165 when the original delivery attempt through other preferred modes of communication have failed.

As noted above, delivery of messages or documents may be achieved via one of a plurality of media according to the preferences set by the recipient employee at 180. The message delivery system 100 of the present invention further comprises a closed-loop tracking system 115 which tracks the responses of each of the plurality of recipient regarding the messages or documents they received . The communications system 120 electronically delivers messages/ documents to each of a plurality of recipients at 170. Such electronic delivery is depicted by arrow 105 in order to better understand the concept.

The closed-loop tracking system 115 communicates with communications system 120 and provides feedback regarding recipient employee responses. The communications system 120 causes to suppress follow-up data/information to those recipients who have responded to an earlier sent related message or document requesting the same response. This process eliminates delivery of multiple messages or documents that are duplicates, or have no relevant information attached to them in an ongoing "call to action" campaign. The process is implemented by identifying an outgoing communication as part of a campaign (as set forth in FIG. 3) such as "enroll for on-line travel" and clearing the response flags for all recipients (as set forth in FIG. 2). As individuals respond to the campaign, their individual response flags are set for that campaign in the database system 130 so that the communications system 120 can then suppress further mailings to those individuals who have already responded or enrolled for that program.

Those skilled in the art would appreciate that the depiction of the closed-loop message delivery system 100 shown in FIG. 1 is a somewhat simplified view of a typical message delivery system. Additional components may be contained within the message delivery system 100. Moreover, the organization of the message delivery system may differ from that depicted in FIG. 1. The depiction in FIG. 1 is intended to be merely illustrative and not limiting of the present invention.

Referring now to FIG. 2, there is shown a chart that provides an overview of the steps performed to complete document submission by a sender, for delivery to the intended recipients, in the illustrative embodiment. 210 represents users located at a plurality of sources or locations who wish to send messages or documents through the closed-loop message delivery system as disclosed in the preferred embodiment of the present invention. Each of the plurality of users may submit messages or messages with appended documents in a variety of formats. Users located at 210 may send their documents or messages with appended documents via a plurality of communication media.

Messages and or documents sent by the users are received in the communications system 120. Each sender defines or selects recipients from a recipient list stored in database system 130. As discussed with respect to FIG. 1, the database system also stores address and contact information of recipients and also their preferences, for example their preferred mode of communication and preferred format for receiving such information. The media and message selection system 220 may be a separate and independent entity from recipient database 130 and that message selection system 220 and recipient database 130 may be communicatively coupled with one another.

It may also possible to store channel and message selection preferences of recipients along with recipient address and contact information in a database at a single location or in a distributed database system. In that sense, the channel and message selection system 220 and recipient database 230 would be collectively represented as database system 130 as set forth in FIG. 1. It would be a matter of convenience and design choice to store information in a database at one location or split the database to store distinct information and provide communication between the split units of the database. Therefore, the location of the database and the limitation on the number of databases being used to store information should not be construed as a limitation with respect to the present invention.

Further to a sender defining or selecting recipients and identifying a "campaign" for each set of interrelated documents or messages, wherein a sender creates messages concerning a particular category that are intended to be received by a plurality of recipients as identified by the recipient list created by the sender, communications system 120 initializes message status flags for each of the recipients, the message status flags being stored in the recipient database system 130. As identified before, each user of the closed-loop message delivery system is expected to register their contact & address information, and their preferred mode of communication along with a preferred document format for receiving the information from a sender, and such information would be stored in the recipient database 130 in the form of message flags.

Thus, upon verifying the preferences of a recipient, the communication system 120 forwards the messages or documents to each of the recipients in their intended document format and via their preferred medium of communication. For simplicity, all the modes of communication through which documents or messages could be delivered to each of a plurality of recipients are designated under numerals 170 and 180.

Once a message has been received and the recipient has responded, FIG. 2 also illustrates the operation of ongoing closed-loop message delivery. If the communications system 120 receives a response or feedback from a recipient who has earlier received a message or a document from the sender, such a response would set the message flag in the recipient preference database 230 and follow-up messages or documents would be suppressed which closes the loop of the message delivery system 100.

Closing the loop further to receiving a response from a recipient provides good opportunity to reduce document distribution costs while improving delivery speed, accuracy, and effectiveness. The closed-loop multimedia message delivery system of the present invention offers a number of benefits to corporate communications and to company employees. Some of such benefits include, for example, (a) delivery of information to employee through their preferred channel of communication and in their preferred document format(s); (b) reduction in paper, printing, mailing, and delivery costs; (c) faster delivery of information in a more consistent manner; (d) ability to focus follow-up messages on employees who have not responded to a message or notification; (e) personalization/condensation of messages to reduce message volume and employee message overload. All the above-identified factors improve the credibility of corporate communication systems.

Figure 3:
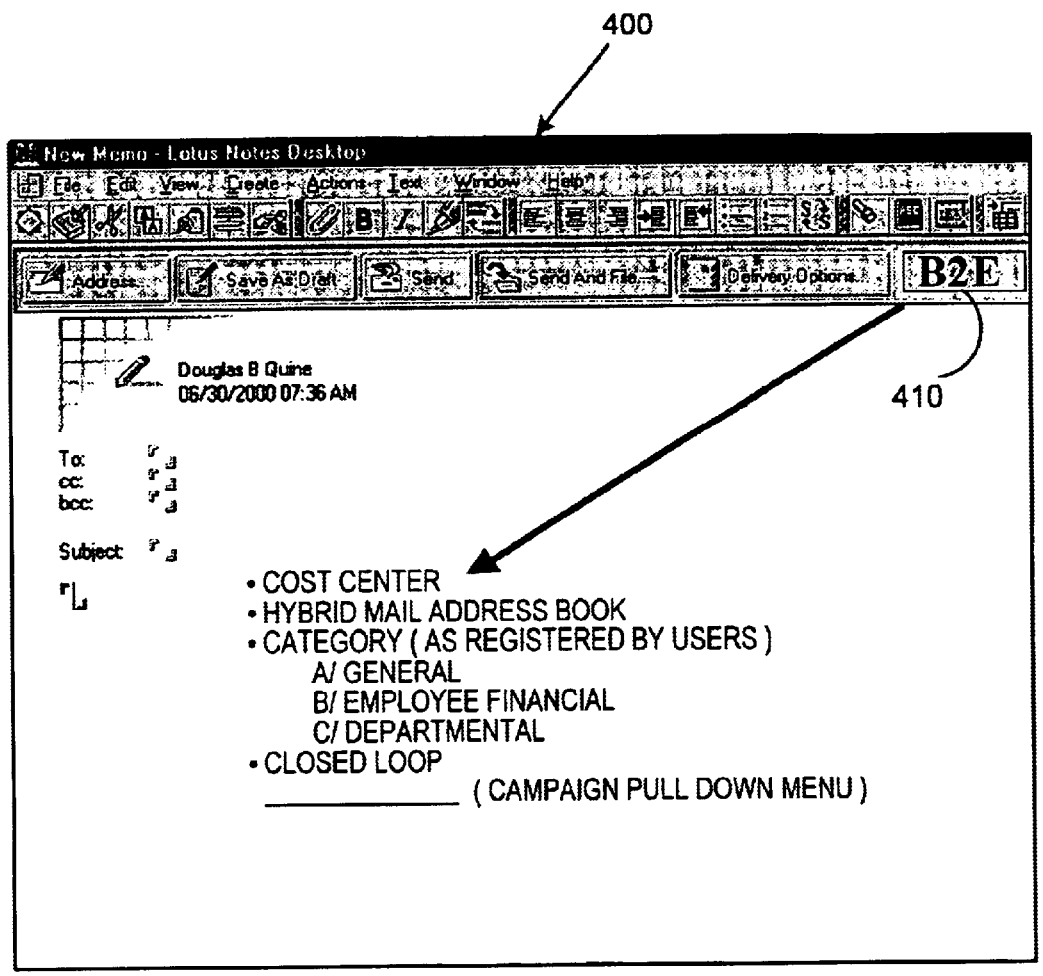
FIG. 3 shows an interface for submission of documents or messages using the closed-loop message delivery system of the present invention.

Referring now to FIG. 3, there is shown a user interface for submission to the closed-loop message delivery system of the present invention. The user Interface 400 could be displayed on a conventional monitor screen coupled to a computer suitable for performing the operations of the closed-loop message delivery system 100. Although, the present invention is shown to be implemented in Lotus Notes™, it is shown merely as an illustration. It will be understood that the user interface 400 could be customized in any manner according to the need and preferences of a user. It should be further understood that the closed-loop message delivery system of the present invention may also be implemented using other applications such as Microsoft Office, etc. Additionally, all of the interfaces of closed-loop message delivery system 100 of the present invention are completely customizable in the preferred embodiment. Furthermore, all of the reports provided by the user interface 400 in response to user requests are completely customizable.

Figure 4:
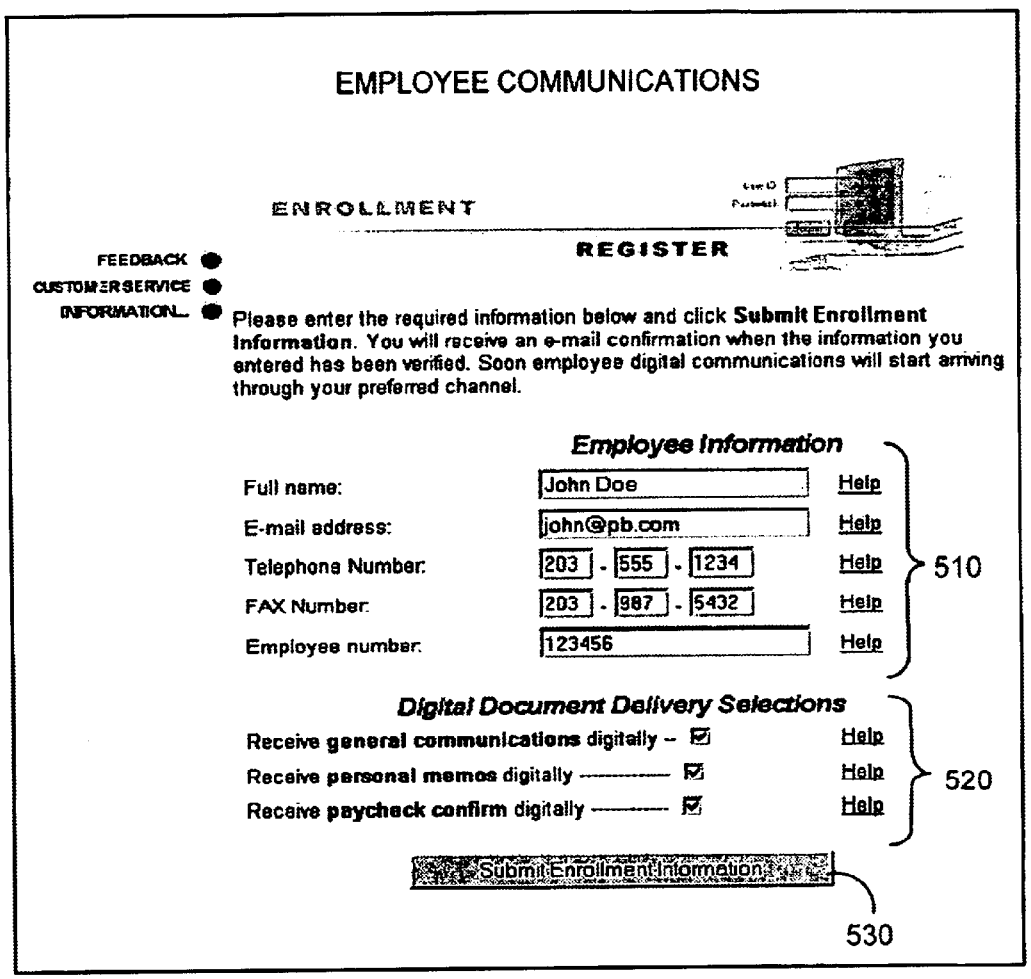
FIG. 4 shows an employee data entry and registration screen for registering employee preferences in order to receive information according to their registered preferences.

Referring now to FIG. 4, there is shown an employee data entry and registration interface 500 for registering employee preferences in order to receive information in their preferred channel of communication. Portion of the registration interface 500 designated as 510 seeks information about an employee of an organization and who would be a user of the closed-loop message delivery system of the present invention. Registration interface 500 also provides an employee registering at 510 with a choice of receiving information or documents in a preferred mode of communication as identified at 520. The registration interface 500 also provides the registering user an ability to include an alternate means of communication should there be a problem with the preferred primary mode of communication as chosen by the user.

One of the advantages of user enrollment may be that the user preferences can be set regarding document types or formats including a preferred mode of communication for receiving such documents or messages. An employee might desire hard copy of financial documents (for example, pay stub, 401(k) statement) and elect electronic delivery of general employee communications. Although registration and enrollment interface 500 is shown with a particular embodiment for illustrative purposes, it will be understood that registration interface 500 can be customized in any manner according to the needs and preferences of the user.

Thus, using the detailed registration and enrollment interface 500 of the closed-loop multimedia message delivery system, it is possible for a user/employee of the closed-loop message delivery system 100 to specify a preferred mode of delivery for a variety of documents/messages associated with a corporate entity. Because the interfaces are fully customizable, the closed-loop multimedia message delivery system can be advantageously implemented and applied to any organization or operation wherein message(s) or document(s) delivery is performed.

The previous description of the preferred embodiments is provided to enable a person skilled in the art to make and use the present invention. As aforementioned, the various modifications to these embodiments will be readily apparent to those skilled in the art and the generic principles defined herein can be applied to other embodiments without the use of the inventive faculty. Thus, the present invention is not intended to be limited to the embodiments shown herein but is to be accorded the widest scope consistent with the principles and novel features disclosed.

What is claimed is:

1. In a closed-loop multimedia system, a method for delivering information comprises the steps of:

(a) receiving input data in a communications system from a plurality of sources in a plurality of formats via a plurality of media;

(b) forwarding said received input data to each of a plurality of recipients in a plurality of formats via a plurality of media, each of said plurality of recipients defining a preferred format and mode of communication from among said plurality of formats and said plurality of media;

(c) storing address and preference information for each of said plurality of recipients in a database system;

(d) keeping track of feedback responses from each of said plurality of recipients; and (e) suppressing follow-up data messages to those recipients from among said plurality of recipients who have responded to an earlier related message, thereby eliminating unnecessary communication.

2. The method of claim 1 further comprising the step of:

reporting the message distribution activity to an accounting system for processing accounting information associated with data forwarded to each of said plurality of recipients.

3. The method of claim 2 wherein each of said plurality of recipients are selected by defining the desired parameters for each of said recipients.

4. The method of claim 2 wherein each of said plurality of recipients are selected from a pre-existing distribution list to which each of said recipients belong.

5. The method of claim 4, wherein each of said plurality of recipients pre-register their preferred mode of communication for receiving information.

6. The method of claim 5, wherein the preferred mode for each of said plurality of recipients is determined in accordance with a message type.

7. The method of claim 1, wherein step(b) further comprises selecting an alternate mode of communication.

8. The method of claim 1, wherein users at each of said plurality of sources define an identification for each set of inter-related messages whereby delivery of follow-up messages to a recipient are suppressed when said recipient has responded to an earlier related message.

9. The method of claim 1, wherein feedback responses from each of said plurality of recipients are tracked and identified by means of a uniform resource locator (URL) stored in said database system.

* * * * *